Nov. 9, 1965     W. NARCUM     3,216,472
POTATO PEELER
Filed Jan. 13, 1964
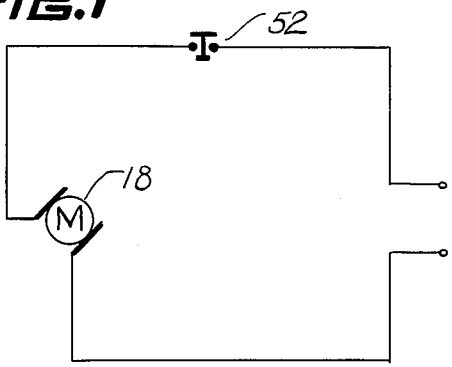
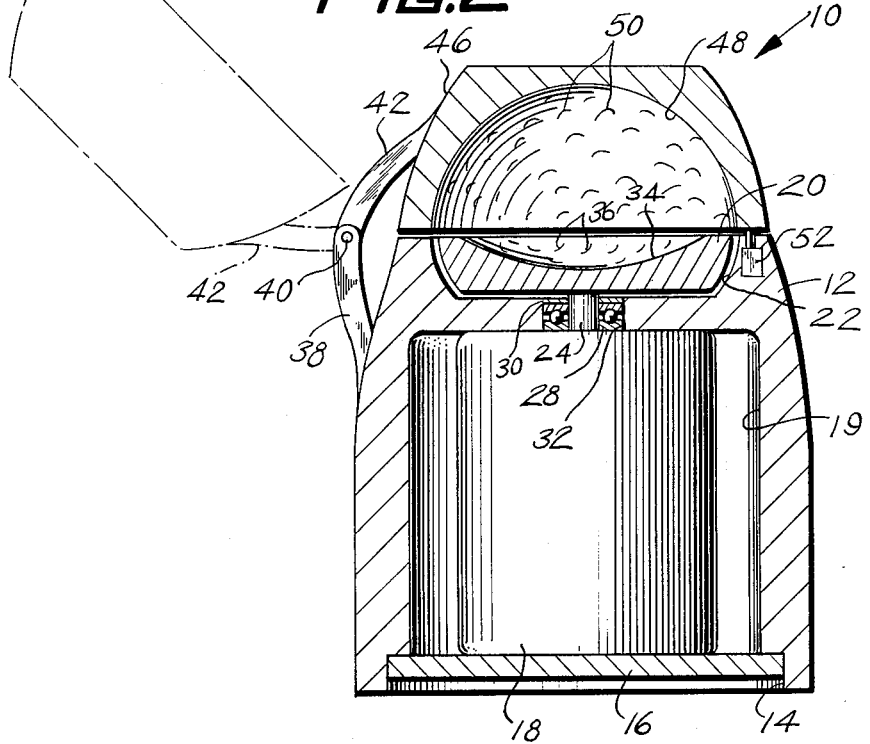
INVENTOR.
William Narcum

3,216,472
POTATO PEELER
William Narcum, Rte. 1, Box 70, Cary, Ill.
Filed Jan. 13, 1964, Ser. No. 337,272
1 Claim. (Cl. 146—49)

This invention relates to peeling devices, and more particularly to a potato peeling device.

It is a primary object of the present invention to provide a potato peeler which will remove potato skins and may be easily transported from one place to another.

Another object of the present invention is to provide a potato peeler which will be useful and practical for the housewife and will be economical to purchase.

A further object of the present invention is to provide a potato peeler which will be of such design as to handle one large potato or a plurality of small potatoes per cycle of operation to fit into the housewife's requirements.

Other objcts of the invention are to provide a potato peeler bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a schematic wiring diagram of the present invention; and

FIGURE 2 is a side view of the present invention shown in section and in elevation.

Referring to the drawing, a potato peeler 10 made in accordance with the present invention is shown to include a hollow tapered housing 12 having an opening 14 which receives a base plate 16 to which an electric motor 18 is secured by suitable fastening means. Motor 18 is received within cavity 19 of housing 12 and a circular turntable 20 is freely and rotatably received within a bell-shaped opening 22. Turntable 20 is fitted to shaft 24 of motor 18 and is removable for cleaning after a peeling operation. A ball bearing 28 and a seal 30 are received within opening 32 of housing 12. Seal 30 prevents penetration by fluids or solids removed from the potato (not shown). The upper extremity of turntable 20 is provided with a concave surface 34 having a plurality of spaced apart projections 36 which engage with the potato by peripheral force when the device is in operation. An arcuate arm 38 is fixedly secured to one side of housing 12 and receives a pivot pin 40 through its upper extremity and pin 40 is secured within an arm 42 which extends outwardly from the side of the hollow cover 46. A concave surface 48 is provided with a plurality of projections 50 which frictionally engage and remove the skin from the potato received within the device. A normally open switch 52 is secured within the upper extremity of housing 12 and extends partially upwardly to engage the face of cover 46 when it is closed and provides a means for automatically starting and stopping potato peeler 10.

In operation, the potatoes are placed upon surface 34 and cover 46 is pivoted closed which will depress switch 52 within housing 12 to close the electrical circuit to motor 18 which will rotate, thus spinning the potato against projections 36 and 50 which will remove the skin from the potatoes.

It will be noted that when cover 46 is lifted and pivoted out of the way, switch 52 will automatically disconnect the circuit to motor 18.

It shall further be noted that the potato peeler 10 heretofore described may be made completely portable by the use of batteries for power to the motor.

While various changes may be made in the detail construction, it shall be understood that such changes shall be within the spirit and scope of the present invention as defined by the appended claim.

What I claim as new and desire to protect by Letters Patent of the United States is:

A potato peeler comprising, in combination, a hollow substantially cylindrical housing having a diametrical partition wall defining upper and lower chambers, a base plate secured to the housing and closing the bottom of the lower chamber, an electric motor mounted firmly on said plate within and substantially filling said lower chamber, a shaft driven by said motor and extending through the partition and terminating within the upper chamber, a bearing seal in said partition and surrounding said shaft, a turntable having a concave upper surface mounted on said projecting shaft within said upper chamber, a plurality of projections on the concave surface of said turntable, a substantially bell shaped cover overlying the upper chamber, hinge means connecting said cover to the housing, a plurality of projections on the inside surface of the bell shaped cover, said projections cooperating with the projections on the turntable to effect de-skinning of a potato when the motor is operated to rotate the turntable.

References Cited by the Examiner
UNITED STATES PATENTS

| 1,445,867 | 2/23 | Binder | 146—49 X |
| 2,656,557 | 10/53 | Vargo | 15—3.1 X |
| 2,664,128 | 12/53 | Brunwalder | 146—67 |
| 2,781,175 | 2/57 | Metzger | 241—101 |

ROBERT C. RIORDON, *Primary Examiner.*
WILLIE G. ABERCROMBIE, *Examiner.*